Jan. 10, 1950 T. G. HARE 2,493,817
POWERED THREE-WHEELED VEHICLE
Filed July 1, 1946 3 Sheets-Sheet 1
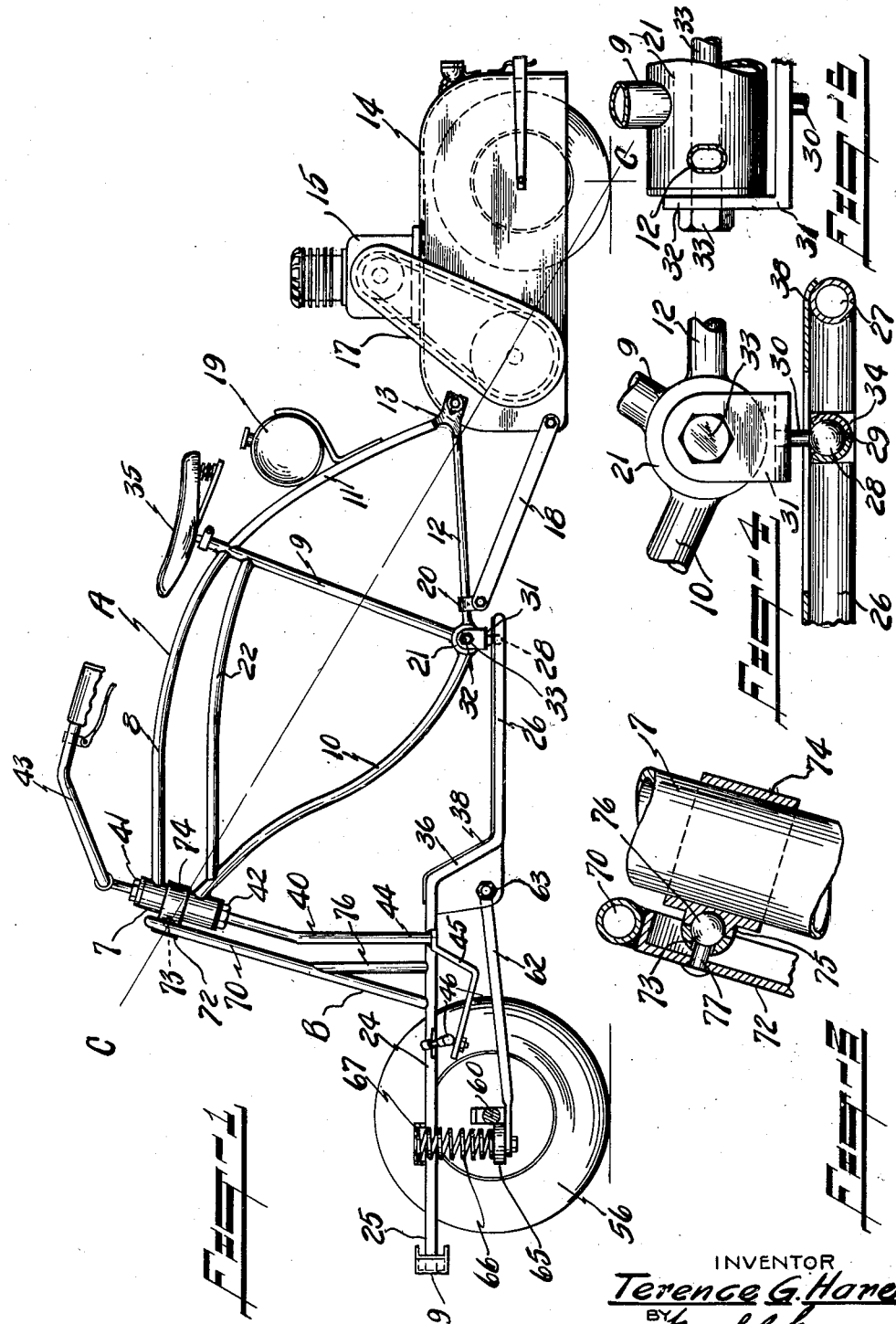
INVENTOR
Terence G. Hare,
BY Frank C. Karman.
ATTORNEY Jan. 10, 1950 T. G. HARE 2,493,817
POWERED THREE-WHEELED VEHICLE
Filed July 1, 1946 3 Sheets-Sheet 2
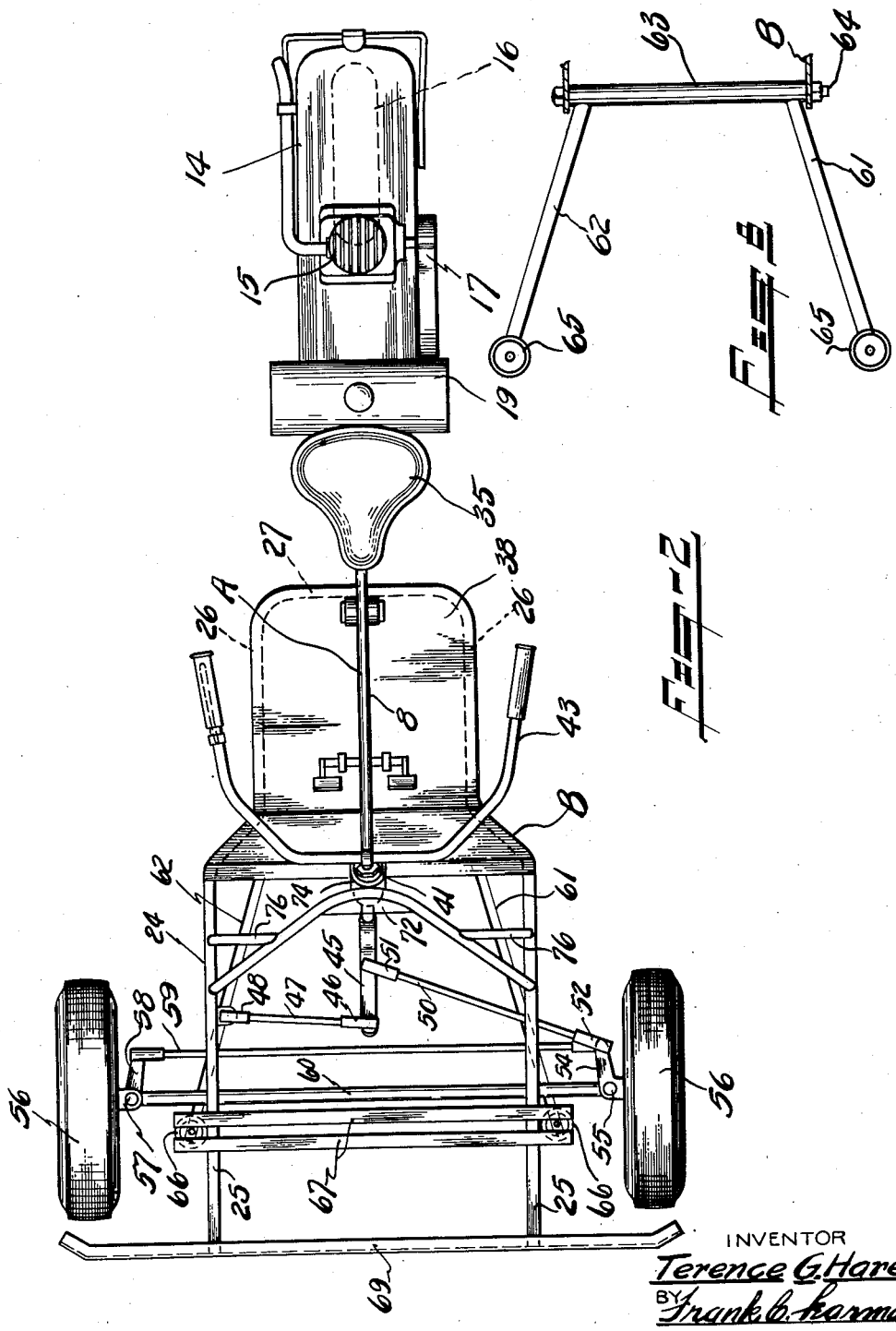
INVENTOR
*Terence G. Hare*
BY *Frank C. Karman*
ATTORNEY

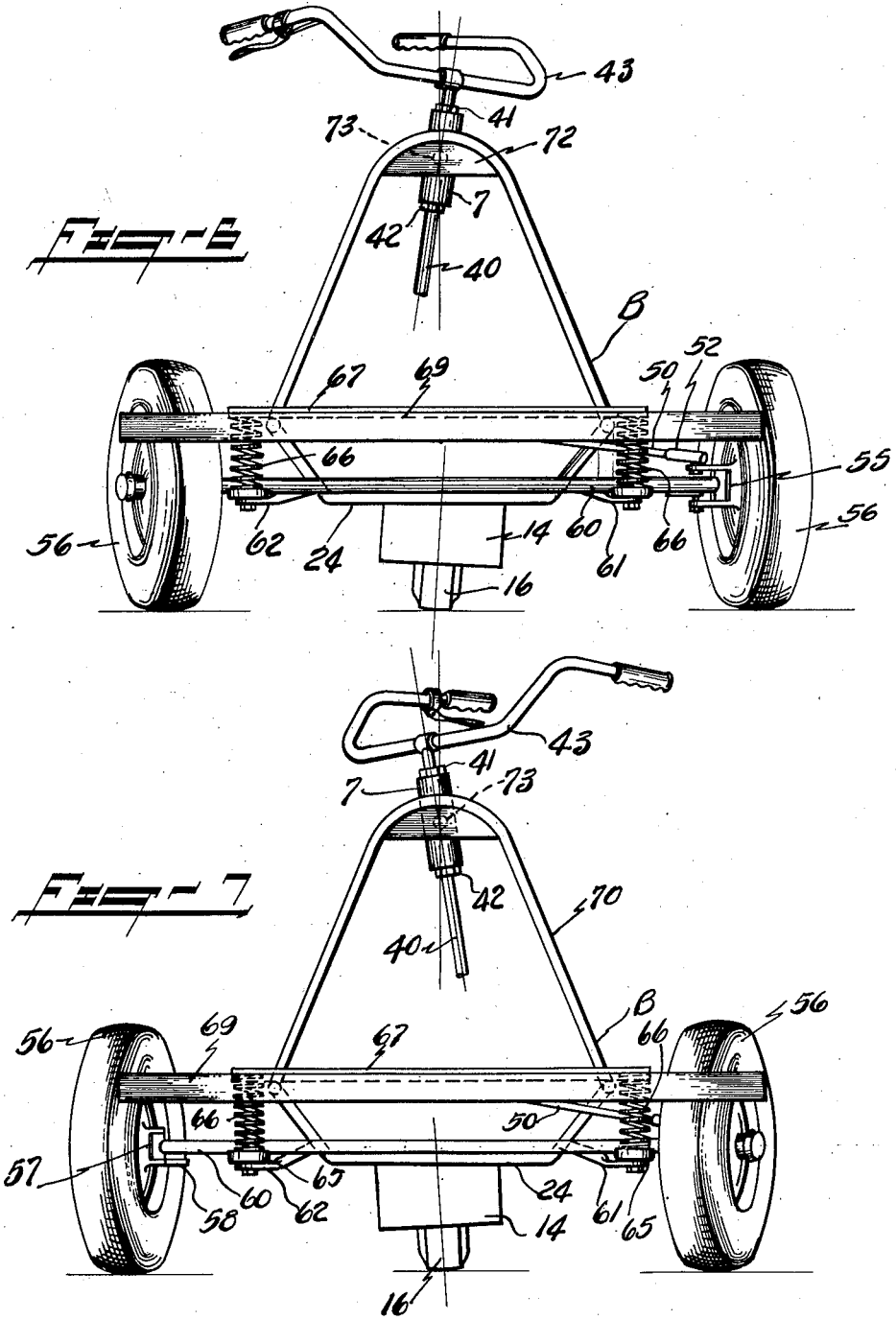

Patented Jan. 10, 1950

2,493,817

UNITED STATES PATENT OFFICE 2,493,817

POWERED THREE-WHEELED VEHICLE

Terence G. Hare, Saginaw, Mich.

Application July 1, 1946, Serial No. 680,534

11 Claims. (Cl. 180—25)

The invention relates to improvements in power-driven, three-wheeled vehicles and more particularly to a vehicle having two transversely spaced front steering wheels and a single driven rear wheel.

It is an object of the invention to provide a vehicle of the type referred to with an improved and novel chassis composed of a rigid, vertical upper frame to which a rigid horizontal frame is flexibly connected by two relatively widely spaced ball joints so as to enable the upper frame to tilt during the steering of the vehicle about an axis passing through the point of rear wheel contact with the road and a point above the front wheels on the head of the handle bar post.

One of said ball joints is spaced below the said axis about which the upper frame is caused to tilt when the vehicle is steered to either side, and the distribution of the load to the chassis is always such that the correct proportion of the load is carried below this axis to obtain stability when the vehicle travels around curves and corners and also to give the correct amount of steering lead, i. e., the load weight will tend to straighten out the steering wheels to a straight path on the road.

It is also an object of the invention to provide a power-driven three-wheeled vehicle having two steerable front wheels and a single driven rear wheel with a novel steering mechanism, which permits the vehicle to be readily controlled during its operation in somewhat similar manner as a conventional bicycle.

Another object of the invention is to provide a power-driven three-wheeled vehicle with two spaced front wheels mounted on the front axle carried by a rigid sub-frame and having their pivots connected for simultaneous steering movements. A steering post operated by a handle bar and arranged on a conventional bicycle frame, which latter is flexibly attached to the sub-frame, is operatively connected with the front wheels, whereby the weight of the driver is effectively utilized, in similar manner as when riding a conventional bicycle, to control the steering of the vehicle.

Other objects of the invention will be apparent or will be specifically pointed out in the description forming a part of this specification, but it is understood that the invention is not limited to the embodiment herein described as various forms may be adopted within the scope of the appended claims.

Referring to the drawings which illustrate a preferred embodiment of the invention:

Fig. 1 is a side-elevational view of a three-wheeled vehicle made in accordance with the present invention.

Fig. 2 is a top plan view of the same.

Fig. 3 is a sectional view of the upper flexible joint arranged on the tubular handle post.

Fig. 4 illustrates, in detail, and partly in section, the lower flexible joint arranged at the lowest point of the upper frame.

Fig. 5 is a fragmentary, end view of the socket member and bracket shown in Fig. 4.

Fig. 6 is a front-elevational view of the vehicle when making a left-hand turn.

Fig. 7 is a front-elevational view of the vehicle when making a right-hand turn.

Fig. 8 is a detail plan view of the torsion bar assembly.

Referring to the drawing, the upper portion of the chassis consists of a conventional bicycle frame A having a head tube 7, a top tube 8, a seat tube 9, a bottom tube 10 and two pairs of back stays 11 and 12, the rear ends of which are joined at 13 and connected to the upper portion of the casing 14. The latter carries an internal combustion engine 15 and contains the single rear wheel 16 which is drivingly connected with the engine 15 by a transmission, a portion of which is indicated at 17.

A fuel tank 19 is mounted on the upper pair of back stays 11. A pair of bars 18 connect the lower portion of the casing 14 with a pair of clamping devices 20 attached to the forward end of the lower back stays 12 adjacent the socket member 21 which joins the bottom tube 10, the seat tube 9 and the lower back stays 12 with each other. An additional tube 22 connects the upper portion of the seat tube 9 with the upper portion of the bottom tube 10 to give additional strength to the bicycle frame A.

The sub-frame B of the chassis consists of a horizontally arranged U-shaped tubular frame 24 having the outer ends 25 of its legs spaced a greater distance from each other than the inner ends 26 of the legs which are connected with each other by the base portion 27 of the frame. The inner portion 26, 27 of the frame 24 is arranged below the bicycle frame A and is connected with the latter by a flexible joint 28.

This flexible joint comprises a ball 29 (Fig. 4) on a vertical stem 30 attached with its upper end to the base of a U-shaped bracket 31, the legs 32 of which are secured by a transverse bolt 33 to the socket member 21 of the bicycle frame A. The ball 29 is arranged in a ball socket 34 mounted centrally on the horizontal U-shaped frame 24 directly below a plate 38 secured to the top face of the U-shaped frame. The plate 38 forms a platform which serves as a resting place for the feet of the driver of the vehicle when the latter occupies the saddle 35 on top of the seat tube 9.

It will be noted from Figs. 1 and 2, that the horizontally arranged U-shaped frame 24 is arranged in two planes, with the forwardly extending outer ends 25 of the legs of the frame 24, which are more widely spaced from each other than the inner ends 26 of the frame, arranged in a higher plane than the closed rear end of the frame 24 having the plate 38 secured thereto.

The outer ends 25 of the legs are connected by downwardly inclined leg portions 36 which are also the inner ends 26 of the legs and are covered by the plate 38 forming the platform.

A steering post 40 extends rotatably through the head tube 7 and is prevented from axial movement with respect to the latter by upper and lower positioning nuts 41 and 42. The upper end of the steering post 40 has attached thereto a handle bar 43. The lower portion 44 of the steering post 40 is arranged vertically and has rigidly attached to its lower end a forwardly extending angular steering arm 45 having its foremost end connected by a cardanic joint 46 with a transversely extending bar 47 which in turn is connected by another cardanic joint 48 with one of the outer end portions 25 of the frame 24.

A steering rod 50 is attached with one end of the center portion of the steering arm 45 by a cardanic joint 51 and with its other end by a cardanic joint 52 to the steering lever 54 carried by the pivot 55 on which, in the present instance, the left hand front wheel 56 is mounted.

The other front wheel 56 is mounted on a pivot 57 having a steering lever 58. A cross rod 59 connects the steering levers 54 and 58 with each other for simultaneous opertion of both wheels and an axle 60 is pivotally connected to the pivots 55 and 57 respectively. The extreme forward ends of the supporting bar 61, 62 are provided with seat members 65 for the lower ends of coil spring 66, the upper ends of which are confined by a pair of transversely extending angle iron bars 67 which are fixedly attached to the leg portions 25 of the U-shaped frame 24. The extreme forward ends of the leg portions 25 of the U-shaped frame 24 are rigidly connected with each other by a transverse bar 69 forming a bumper for the vehicle.

Members 61 and 62 are rigidly connected together at their rear ends by means of a tubular member 63 rockably mounted on a rod 64, and these members as a group form a U-shaped torsion assembly pivotally connected to chassis member 38 on each side of the chassis. This torsion assembly restricts any side sway of the main frame A, holding same in proper relation with the front axle at all times.

An inverted V-shaped tubular member 70 is attached with its outer ends to the two widely spaced end portions 25 of the legs of the U-shaped frame 24 and extends upwardly and substantially parallel to the axis of the head tube 7 of the bicycle frame A.

The upper closed end of the V-shaped tubular member 70 has fixedly attached thereto a flanged plate 72 which by means of a flexible joint 73 is flexibly attached to the head tube 7. As particularly shown in Fig. 3, the head tube 7 is surrounded by a sleeve 74 carrying a ball socket 75.

The ball 76 in the socket 75 is provided with an outwardly extending stem 77 which is fixedly secured to the flanged plate 72. The lower ends of the inverted V-shaped member 70 is connected by bracing struts 76 with the end portions 25 of the frame 24 to reinforce the chassis at these points.

According to the foregoing description, the chassis of the vehicle of the invention consists of two rigid frames, A and B, which are flexibly connected with each other at two widely spaced points by the ball joints 28 and 73 of which the latter is positioned forwardly of the former and at a substantially higher elevation. The frame A, consisting of a conventional bicycle frame and having connected thereto the casing 14 with the engine 15 and the rear wheel 16, is arranged in a substantially vertical plane, while the sub-frame B, consisting of the U-shaped frame 24 and the front wheel axle 60 for the two front wheels 56, is arranged in a substantially horizontal plane.

In operating the vehicle, the bicycle frame A with its attached engine casing 14, may tilt or roll about an inclined axis indicated with C—C of Fig. 1. This axis passes through the upper flexible joint 73 on the head tube 7 and through the point where the rear wheel 17 engages the ground. The bicycle frame A retains its normal vertical position within the longitudinal center plane of the vehicle as long as the latter travels along a straight path.

Upon turning to either side, the bicycle frame A tilts about the axis C—C, with the lower ball joint 28 moving laterally outwardly of the longitudinal vertical center plane opposite to the side to which the vehicle is turning. During this tilting movement of the frame A relatively to the frame B the steering post 40 does not only turn about its bearing axis in the head tube 7, but at the same time is tilted with the bicycle frame A about the ball joint 73, as shown in Fig. 6, for a left-hand turn, and as shown in Fig. 7 for a right-hand turn of the vehicle. The ball joint 28, during the tilting movement of the frame A, shifts the sub-frame B substantially in a horizontal plane, thereby shifting also the front axle 60 in a direction which assists the front wheels 56 of their steering movement.

The axis C—C is positioned in such a relation to the lower ball joint 28 that the correct percentage of the load weight is carried below this axis, so as to obtain ease and stability in turning corners and to give the correct amount of steering lead. The load weight affecting the steering is such that it will always tend to straighten out the steering of the vehicle to a straight path on the road.

Owing to the provision of three traction wheels, the vehicle of the invention is inherently stable, but the flexible connections between the upper bicycle frame A and the rigid sub-frame B and the described steering mechanism imparts to the vehicle the easy maneuverability of a bicycle, particularly when making turns or traveling along curved roadways with relatively high speed.

What I claim is:

1. In a power-driven three-wheeled vehicle, a chassis comprising a rigid vertical frame and a rigid horizontal sub-frame provided with a vertical post, the upper end of which is universally connected to the vertical frame, the rear end of the horizontal sub-frame being universally connected to the vertical frame at a point spaced rearwardly from said post, a horizontal front axle carried by the sub-frame and having two front steering wheels pivotally attached thereto, a driven rear wheel, means attaching the driven rear wheel to said vertical frame, a driver's seat on said vertical frame, and manually operable steering means on said vertical frame, a bar, cardanic joints connecting said bar to said steering means and sub-frame respectively, and a steering rod operatively connecting said steering means with the front steering wheels.

2. In a power driven three wheeled vehicle, a chassis comprising a main frame having a head tube and a bottom socket, and a rigid horizontal sub-frame carrying a front axle having two spaced front steering wheels pivotally attached thereto, and universally connected to the main frame at the head tube and at the bottom socket, a driven rear wheel, means attaching the driven wheel to said main frame, a driver's seat on said main frame, and a manually operable steering post extending through said head tube and operatively connected with the two front steering wheels and the sub-frame.

3. In a power driven three-wheeled vehicle, a chassis comprising a main frame having a head tube and a rearwardly spaced bottom socket and a rigid horizontal sub-frame carrying a front axle having two spaced front steering wheels pivotally attached thereto, means for universally connecting said frames with each other at the head tube, and bottom socket respectively, a casing attached to the main frame and carrying an engine and the rear wheel of the vehicle, means for driving said rear wheel by said engine, a driver's seat on said main frame, and a manually operable steering post extending rotatably through said head tube and operatively connected with the two front steering wheels and the sub-frame respectively.

4. In a power driven three-wheeled vehicle, a chassis comprising a vertical main frame having a head tube and a bottom socket and a rigid horizontal sub-frame carrying a front axle having two spaced front steering wheels pivotally attached thereto, means for universally connecting said frames with each other at two spaced points, one point being located on the head tube and the other one at the bottom socket of said main frame, a rear wheel, vertically spaced means for attaching the rear wheel to said main frame, a driver's seat on said main frame, a manually operable steering post extending rotatably through said head tube, a steering arm fixedly attached to the lower end of said steering post and extending forwardly in the direction of travel of the vehicle, a bar extending transversely to the path of travel and having its ends flexibly connected to the outer end of said steering arm and to said rigid sub-frame respectively, a steering rod connecting said steering arm flexibly with one of said front wheels, and means connecting both front wheels with each other to cause the same to move simultaneously when the steering post is actuated.

5. In a power-driven three-wheeled vehicle, a chassis comprising a frame having a head tube and a bottom socket and a rigid horizontal sub-frame carrying a front axle having two spaced front steering wheels pivotally attached thereto, an upwardly extending member on said horizontal sub-frame and having its upper end flexibly connected with said head tube by a ball joint, another ball joint connecting the rear end of said horizontal sub-frame with the bottom socket of said frame, a driven rear wheel, means attaching the driven wheel to said frame, a driver's seat on said frame, and a manually operable steering post extending through said head tube and operatively connected with the two front steering wheels and the sub-frame.

6. In a power-driven three-wheeled vehicle, a chassis comprising a frame having a head tube and a bottom socket and a rigid horizontal sub-frame carrying a front axle having two spaced front steering wheels pivotally attached thereto, an upwardly extending member on said horizontal sub-frame and having its upper end universally connected with said head tube by a ball joint, another ball joint connecting the rear end of said horizontal sub-frame with the bottom socket of said vehicle frame, a casing attached to the frame and carrying an engine and the rear wheel of the vehicle, a seat on said frame, and a manually operable steering post extending rotatably through said head tube and operatively connected with the two front steering wheels and the sub-frame.

7. In a power-driven three-wheeled vehicle, a chassis comprising a rigid vertical frame having a head tube and a bottom socket, a rigid horizontal sub-frame, means for flexibly connecting said frames with each other at the head tube and the bottom socket, a horizontal front axle carried by the sub-frame and having two front steering wheels pivotally attached thereto, a driven rear wheel, means attaching the driven rear wheel to said vertical frame, a drivers seat on said vertical frame, and a manually operable steering post extending through said head tube, a steering arm attached to the lower end of the post, a transversely extending bar having its ends flexibly connected to said arm and sub-frame respectively, said arm being operatively connected with the front steering wheels, the head tube being positioned at a higher elevation than the bottom socket so that a line from the flexible connection of the head tube to the point of contact of the rear wheel with the road surface forms a pivot axis about which the rigid vertical frame is caused to tilt relatively to the subframe when the vehicle turns around corners during its travel.

8. In a power-driven three-wheel vehicle having a main frame having a vertical head tube and a bottom socket, a sub-frame, a power unit and rear wheel connected to the main frame, a torsion assembly attached to said sub-frame at a point intermediate the front and rear wheels and including two pivotally mounted front steering wheels pivotally attached to the front axle and connected by a tie rod, a resilient suspension between the front end of the torsion assembly and the sub-frame, said sub-frame being universally connected to the main-frame at the head tube and at the bottom socket to permit the main frame to roll about an axis leading from the point of road contact of the rear wheel with the road and the pivot point located at the head tube above the front axle, and means whereby said roll is controlled in relation to the steering mechanism.

9. In a power-driven vehicle having spaced-apart front wheels and a single rear wheel, said vehicle including a main frame having a head tube and a bottom socket, and a horizontal sub-frame flexibly connected to the main frame at the head tube and the socket to enable the main frame to tilt during the steering of the vehicle about an axis of chassis roll passing through the point of rear wheel contact with the ground, and the head tube on the main frame spaced a predetermined distance above the front wheels of the vehicle, and means for driving said rear wheel.

10. The combination defined in claim 9 in which the front wheels are movable vertically, as a unit, with relation to the horizontal sub-frame.

11. The combination as set forth in claim 9 in which the sub-frame includes a torsion assembly with its rear end hingedly connected to the sub-frame, and resilient means interposed between the front end of the assembly and the sub-frame.

TERENCE G. HARE.

REFERENCES CITED

The following references are of record in the file of this patent:

UNITED STATES PATENTS

| Number | Name | Date |
|---|---|---|
| 609,237 | Monnot | Aug. 16, 1898 |
| 842,833 | Hedstrom | Jan. 29, 1907 |
| 891,102 | Razoux | June 16, 1908 |
| 1,059,466 | Hosmer | Apr. 22, 1913 |